United States Patent
Merry et al.

(10) Patent No.: US 10,400,629 B2
(45) Date of Patent: Sep. 3, 2019

(54) GAS TURBINE ENGINE SHAFT BEARING CONFIGURATION

(71) Applicant: United Technologies Corporation, Hartford, CT (US)

(72) Inventors: Brian D. Merry, Andover, CT (US); Gabriel L. Suciu, Glastonbury, CT (US); Todd A. Davis, Tolland, CT (US); Gregory E. Reinhardt, South Glastonbury, CT (US); Enzo DiBenedetto, Kensington, CT (US)

(73) Assignee: United Technologies Corporation, Farmington, CT (US)

( * ) Notice: Subject to any disclaimer, the term of this patent is extended or adjusted under 35 U.S.C. 154(b) by 3 days.

(21) Appl. No.: 14/012,576

(22) Filed: Aug. 28, 2013

(65) Prior Publication Data

US 2014/0230403 A1    Aug. 21, 2014

Related U.S. Application Data

(63) Continuation-in-part of application No. 13/904,416, filed on May 29, 2013, which is a continuation of
(Continued)

(51) Int. Cl.
*F02C 7/06* (2006.01)
*F01D 25/16* (2006.01)
(Continued)

(52) U.S. Cl.
CPC .......... *F01D 25/162* (2013.01); *F01D 25/16* (2013.01); *F02C 7/06* (2013.01); *F02C 7/36* (2013.01); *F02K 3/04* (2013.01); *Y02T 50/671* (2013.01)

(58) Field of Classification Search
CPC .. F05D 2260/40311; F02C 3/06; F02C 3/107; F02K 3/06; F01D 25/16
(Continued)

(56) References Cited

U.S. PATENT DOCUMENTS 2,672,726 A     3/1954   Wolf et al.
2,798,360 A     7/1957   Hazen et al.
(Continued)

FOREIGN PATENT DOCUMENTS

EP        0203881        12/1986
EP        1013889        8/2005
(Continued)

OTHER PUBLICATIONS

Amato et al, "Planetary Gears" poster, http://www.roymech.co.uk/Useful_Tables/Drive/Epi_cyclic_gears.html, downloaded Aug. 6, 2015, 1 page.*
(Continued)

*Primary Examiner* — Ted Kim
(74) *Attorney, Agent, or Firm* — Carlson, Gaskey & Olds, P.C.

(57) ABSTRACT

A gas turbine engine includes a core housing that includes an inlet case and an intermediate case that respectively provide an inlet case flow path and an intermediate case flow path. A first shaft supports a low pressure compressor section that is arranged axially between the inlet case flow path and the intermediate case flow path. A first bearing supports the first shaft relative to the inlet case. A second bearing supports a second shaft relative to the intermediate case. A low pressure compressor hub is mounted to the first shaft. The low pressure compressor hub extends to the low pressure compressor section between the first bearing and the second bearing.

12 Claims, 7 Drawing Sheets

Related U.S. Application Data application No. 13/762,970, filed on Feb. 8, 2013, now Pat. No. 8,511,061, which is a continuation of application No. 13/362,170, filed on Jan. 31, 2012, now Pat. No. 8,402,741.

(60) Provisional application No. 61/860,329, filed on Jul. 31, 2013.

(51) Int. Cl.
 *F02C 7/36* (2006.01)
 *F02K 3/04* (2006.01)

(58) Field of Classification Search
 USPC .................................. 60/226.1, 268, 39.163
 See application file for complete search history.

(56) References Cited

U.S. PATENT DOCUMENTS

| | | | |
|---|---|---|---|
| 2,850,337 A | 9/1958 | McCallum | |
| 3,434,288 A | 3/1969 | Petrie | |
| 3,549,272 A | 12/1970 | Bouiller et al. | |
| 3,638,428 A | 2/1972 | Shipley et al. | |
| 3,673,802 A | 7/1972 | Krebs et al. | |
| 3,680,309 A | 8/1972 | Wallace, Jr. | |
| 3,727,998 A | 4/1973 | Haworth et al. | |
| 3,737,109 A | 6/1973 | Johansson | |
| 3,738,719 A | 6/1973 | Langner | |
| 3,747,343 A | 7/1973 | Rosen | |
| 3,761,042 A | 9/1973 | Denning | |
| 3,792,586 A | 2/1974 | Kasmarik et al. | |
| 3,896,615 A | 7/1975 | Slatkin et al. | |
| 3,925,979 A | 12/1975 | Ziegler | |
| 3,971,208 A | 7/1976 | Schwent | |
| 4,003,199 A | 1/1977 | Bell et al. | |
| 4,055,946 A | 11/1977 | Sens | |
| 4,084,861 A | 4/1978 | Greenberg et al. | |
| 4,251,987 A | 2/1981 | Adamson | |
| 4,452,037 A | 6/1984 | Waddington et al. | |
| 4,500,143 A | 2/1985 | Kervistin et al. | |
| 4,523,864 A | 6/1985 | Walter et al. | |
| 4,687,346 A | 8/1987 | Suciu | |
| 4,704,862 A * | 11/1987 | Dennison et al. | 60/226.2 |
| 4,727,762 A | 3/1988 | Hayashi | |
| 4,782,658 A | 11/1988 | Perry | |
| 4,827,712 A | 5/1989 | Coplin | |
| 4,867,655 A | 9/1989 | Barbie et al. | |
| 4,911,610 A | 3/1990 | Olschewski et al. | |
| 4,916,894 A * | 4/1990 | Adamson et al. | 60/226.1 |
| 4,951,461 A | 8/1990 | Butler | |
| 4,952,076 A | 8/1990 | Wiley, III et al. | |
| 4,981,415 A | 1/1991 | Marmol et al. | |
| 5,051,005 A | 9/1991 | Duncan | |
| 5,127,794 A | 7/1992 | Burge et al. | |
| 5,174,525 A | 12/1992 | Schilling | |
| 5,343,696 A * | 9/1994 | Rohra et al. | 60/226.2 |
| 5,380,155 A | 1/1995 | Varsik et al. | |
| 5,410,870 A | 5/1995 | Brauit et al. | |
| 5,433,674 A | 7/1995 | Sheridan et al. | |
| 5,553,449 A | 9/1996 | Rodgers et al. | |
| 5,622,438 A | 4/1997 | Walsh et al. | |
| 5,687,561 A | 11/1997 | Newton | |
| 5,791,789 A | 8/1998 | Van Duyn et al. | |
| 5,806,303 A | 9/1998 | Johnson | |
| 5,809,772 A | 9/1998 | Giffin, III et al. | |
| 5,860,275 A | 1/1999 | Newton et al. | |
| 5,867,980 A | 2/1999 | Bartos | |
| 6,082,959 A | 7/2000 | Van Duyn | |
| 6,148,518 A | 11/2000 | Weiner et al. | |
| 6,158,210 A | 12/2000 | Orlando | |
| 6,203,273 B1 | 3/2001 | Weiner et al. | |
| 6,338,609 B1 | 1/2002 | Decker et al. | |
| 6,439,772 B1 | 8/2002 | Ommundson et al. | |
| 6,464,401 B1 | 10/2002 | Allard | |
| 6,619,030 B1 | 9/2003 | Seda et al. | |
| 6,623,166 B2 | 9/2003 | Andren et al. | |
| 6,732,502 B2 | 5/2004 | Seda et al. | |
| 6,942,451 B1 | 9/2005 | Alexander et al. | |
| 7,004,722 B2 | 2/2006 | Teramura et al. | |
| 7,412,819 B2 | 8/2008 | Bart et al. | |
| 7,487,630 B2 | 2/2009 | Weiler | |
| 7,490,460 B2 | 2/2009 | Moniz et al. | |
| 7,493,753 B2 | 2/2009 | Moniz et al. | |
| 7,500,365 B2 | 3/2009 | Suciu et al. | |
| 7,591,594 B2 | 9/2009 | Charier et al. | |
| 7,634,916 B2 | 12/2009 | Mace et al. | |
| 7,694,505 B2 | 4/2010 | Schilling | |
| 7,704,178 B2 | 4/2010 | Sheridan et al. | |
| 7,730,715 B2 | 6/2010 | Grudnoski et al. | |
| 7,832,193 B2 | 11/2010 | Orlando et al. | |
| 7,882,693 B2 | 2/2011 | Schilling | |
| 7,883,315 B2 | 2/2011 | Suciu et al. | |
| 8,075,261 B2 | 12/2011 | Merry et al. | |
| 8,104,262 B2 | 1/2012 | Marshall | |
| 8,225,593 B2 | 7/2012 | Le Hong et al. | |
| 8,337,149 B1 | 12/2012 | Hasel et al. | |
| 8,402,741 B1 | 3/2013 | Merry et al. | |
| 2001/0047651 A1 | 12/2001 | Fakutani | |
| 2005/0026745 A1 | 2/2005 | Mitrovic | |
| 2005/0150204 A1 | 7/2005 | Stretton et al. | |
| 2005/0265825 A1 | 12/2005 | Lewis | |
| 2006/0090451 A1 | 5/2006 | Moniz et al. | |
| 2006/0130456 A1 | 6/2006 | Suciu et al. | |
| 2006/0196164 A1 | 9/2006 | Donohue | |
| 2006/0239845 A1 | 10/2006 | Yamamoto et al. | |
| 2007/0084183 A1 | 4/2007 | Moniz et al. | |
| 2007/0087892 A1 | 4/2007 | Orlando et al. | |
| 2007/0251210 A1 | 11/2007 | Ceric et al. | |
| 2008/0053062 A1 | 3/2008 | Tuttle | |
| 2008/0098715 A1 | 5/2008 | Orlando et al. | |
| 2008/0098717 A1 | 5/2008 | Orlando et al. | |
| 2008/0148707 A1 | 6/2008 | Schilling | |
| 2008/0152477 A1 | 6/2008 | Moniz et al. | |
| 2008/0155961 A1 | 7/2008 | Johnson | |
| 2009/0056306 A1 | 3/2009 | Suciu | |
| 2009/0074565 A1 | 3/2009 | Suciu et al. | |
| 2009/0081035 A1 * | 3/2009 | Merry | F01D 9/041 415/208.1 |
| 2009/0081039 A1 | 3/2009 | McCune et al. | |
| 2009/0090096 A1 | 4/2009 | Sheridan | |
| 2009/0123271 A1 | 5/2009 | Coffin et al. | |
| 2009/0180864 A1 | 7/2009 | Alvanos et al. | |
| 2009/0314881 A1 | 12/2009 | Suciu et al. | |
| 2010/0058735 A1 | 3/2010 | Hurwitz et al. | |
| 2010/0105516 A1 * | 4/2010 | Sheridan et al. | 475/346 |
| 2010/0170224 A1 | 7/2010 | Clark et al. | |
| 2010/0223903 A1 | 9/2010 | Starr | |
| 2011/0047959 A1 | 3/2011 | DiBenedetto | |
| 2011/0123326 A1 | 5/2011 | DiBenedetto et al. | |
| 2011/0130246 A1 | 6/2011 | McCune et al. | |
| 2011/0219781 A1 | 9/2011 | Benjamin et al. | |
| 2011/0289900 A1 | 12/2011 | Stern | |
| 2012/0195753 A1 * | 8/2012 | Davis et al. | 415/229 |
| 2012/0257960 A1 * | 10/2012 | Reinhardt et al. | 415/122.1 |
| 2013/0023378 A1 | 1/2013 | McCune et al. | |
| 2013/0319006 A1 | 12/2013 | Parnin et al. | |

FOREIGN PATENT DOCUMENTS

| | | |
|---|---|---|
| EP | 2060809 | 2/2011 |
| EP | 2559913 | 2/2013 |
| EP | 2584153 | 4/2013 |
| EP | 2597292 | 5/2013 |

OTHER PUBLICATIONS

"Epicylic Gears", http://www.webpages.uidaho.edu/mindworks/Machine_Design/Posters/PDF/Planetary%20Gears%20Poster.pdf, downloaded Aug. 6, 2015, pp. 1-12.*

Gunston, Bill, "Jane's Aero-Engines," Issue Seven, 2000, pp. 510-512.

(56) References Cited

OTHER PUBLICATIONS

Fledderjohn, "The TFE731-5: Evolution of a Decade of Business Jet Service," SAE Technical Paper, Business Aircraft Meeting & Exposition, Apr. 12-15, 1983.
Walsh et al., "Gas Turbine Performance," 1998, 2004, Blackwell Science Ltd., Chapter 5, pp. 159-177.
International Search Report for PCT Application No. PCT/US2013/020462, dated Jul. 30, 2013.
International Search Report and Written Opinion for PCT Application No. PCT/US2014/043195, dated Feb. 18, 2015.
International Preliminary Report on Patentability for PCT Application No. PCT/US2013/020462 dated Aug. 5, 2014.
International Search Report and Written Opinion for PCT/US14/43175 completed on Dec. 17, 2014.
International Preliminary Report on Patentability for PCT Application No. PCT/US2014/043195, dated Feb. 11, 2016.
International Preliminary Report on Patentability for PCT Application No. PCT/US2014/043184, dated Feb. 11, 2016.
International Preliminary Report on Patentability for PCT Application No. PCT/US2014/043175, dated Feb. 11, 2016.
Supplementary European Search Report for European Patent Application No. 13770230.4, dated Aug. 6, 2015.
Supplementary European Search Report for PCT Application PCT/US2013/020462, dated Aug. 6, 2015.
European Search Report for European Patent Application No. 14849357.0 dated Feb. 22, 2017.
European Search Report for European Patent Application No. 14831790.2 dated Mar. 29, 2017.
Extended European Search Report for European Application No. 14831206.9 dated Mar. 2, 2017.
Extended European Search Report for European Application No. 14849357.0 dated Mar. 22, 2017.
Extended European Search Report for European Application No. 15199861.4 dated Sep. 16, 2016.
"Fan engineering, Information and recommendations for the engineer," Twin City Fan Companies, LTD, 2000.

* cited by examiner

GAS TURBINE ENGINE SHAFT BEARING CONFIGURATION

CROSS REFERENCE TO RELATED APPLICATIONS

This application claims priority to provisional application No. 61/860,329 filed on Jul. 31, 2013, and this application is a continuation-in-part of U.S. application Ser. No. 13/904, 416 filed on May 29, 2013, which is a continuation of U.S. application Ser. No. 13/762,970 filed on Feb. 8, 2013, now U.S. Pat. No. 8,511,061 issued Aug. 20, 2013, which is a continuation of U.S. application Ser. No. 13/362,170 filed on Jan. 31, 2012, now U.S. Pat. No. 8,402,741 issued Mar. 26, 2013.

BACKGROUND

Turbomachines, such as gas turbine engines, typically include a fan section, a turbine section, a compressor section, and a combustor section. The fan section drives air along a core flow path into the compressor section. The compressed air is mixed with fuel and combusted in the combustor section. The products of combustion are expanded in the turbine section.

A typical jet engine has two or three spools, or shafts, that transmit torque between the turbine and compressor sections of the engine. Each of these spools is typically supported by two bearings. One bearing, for example, a ball bearing, is arranged at a forward end of the spool and is configured to react to both axial and radial loads. Another bearing, for example, a roller bearing is arranged at the aft end of the spool and is configured to react only to radial loads. This bearing arrangement fully constrains the shaft except for rotation, and axial movement of one free end is permitted to accommodate engine axial growth.

Epicyclic gearboxes with planetary or star gear trains may be used in gas turbine engines for their compact designs and efficient high gear reduction capabilities. Planetary and star gear trains generally include three gear train elements: a central sun gear, an outer ring gear with internal gear teeth, and a plurality of planet or star gears supported by a carrier between and in meshed engagement with both the sun gear and the ring gear. The gear train elements share a common longitudinal central axis, about which at least two rotate.

During flight, light weight structural cases may deflect with aero and maneuver loads which may cause significant deflection commonly known as backbone bending of the engine. This deflection may result in some misalignment of the gear train elements which may lead to efficiency losses and potential reduced gear life.

SUMMARY

In one exemplary embodiment, a gas turbine engine includes a core housing that includes an inlet case and an intermediate case that respectively provide an inlet case flow path and an intermediate case flow path. A first shaft supports a low pressure compressor section that is arranged axially between the inlet case flow path and the intermediate case flow path. A first bearing supports the first shaft relative to the inlet case. A second bearing supports a second shaft relative to the intermediate case. A low pressure compressor hub is mounted to the first shaft. The low pressure compressor hub extends to the low pressure compressor section between the first bearing and the second bearing.

In a further embodiment of the above, the low pressure compressor hub includes a frustro-conical web which extends between the first bearing and the second bearing.

In a further embodiment of the above, the frustro-conical web extends at least partially around the first bearing.

In a further embodiment of the above, the low pressure compressor is radially outboard of the first bearing.

In a further embodiment of the above, the low pressure compressor hub is angled, relative to an engine axis, toward the low pressure compressor section.

In a further embodiment of the above, the low pressure compressor hub is mounted to a second stage disk of the low pressure compressor section.

In a further embodiment of the above, the low pressure compressor section includes three stages.

In a further embodiment of the above, the first shaft drives a fan through a geared architecture.

In a further embodiment of the above, the first bearing is mounted to a front center body case structure. The front center body case structure defines a core flow path for a core airflow.

In a further embodiment of the above, the inlet case includes a first inlet case portion defining the inlet case flow path. A bearing support portion is removably secured to the inlet case portion. The first bearing is mounted to the bearing support portion.

In a further embodiment of the above, the intermediate case includes an intermediate case portion that defines the intermediate case flow path. A bearing support portion is removably secured to the intermediate case portion. The second bearing is mounted to the bearing support portion.

In a further embodiment of the above, the first bearing is a ball bearing. The second bearing is a roller bearing.

In a further embodiment of the above, the first and second bearings are arranged in separate sealed lubrication compartments.

In a further embodiment of the above, a geared architecture is configured to be driven by the first shaft. A fan is coupled to and rotationally driven by the geared architecture.

In a further embodiment of the above, the first shaft includes a main shaft and a flex shaft. The flex shaft is secured to the main shaft at a first end and including a second end opposite the first end, wherein the geared architecture includes a sun gear supported on the second end.

In a further embodiment of the above, the low pressure compressor hub is secured to the main shaft. The low pressure compressor section includes a rotor mounted to the low pressure compressor hub. The pressure compressor hub supports the first bearing.

In a further embodiment of the above, the inlet case includes an inlet case portion that defines the inlet case flow path. A bearing support portion is removably secured to the inlet case portion. The first bearing is mounted to the bearing support portion.

In a further embodiment of the above, the geared architecture includes a torque frame that supports multiple circumferentially arranged star gears that intermesh with the sun gear. The torque frame is secured to the inlet case.

In a further embodiment of the above, the rotor supports multiple compressor stages. The first bearing is axially aligned with and radially inward of one of the compressor stages.

In another exemplary embodiment, a gas turbine engine includes a core housing that provides a core flow path. A shaft supports a compressor section arranged within the core flow path. First and second bearings support the shaft relative to the core housing and are arranged radially inward of and axially overlapping with the compressor section. A low pressure compressor hub is mounted to the shaft. The low pressure compressor hub extends to the low pressure compressor section between the first bearing and the second bearing.

In a further embodiment of the above, the gas turbine engine includes a fan. The compressor section is fluidly connected to the fan. The compressor section comprises of a high pressure compressor and a low pressure compressor. A combustor is fluidly connected to the compressor section. A turbine section is fluidly connected to the combustor.

In a further embodiment of the above, the gas turbine engine includes a front center body case structure. The first bearing is mounted to the front center body case structure to rotationally support the shaft. A geared architecture is at least partially supported by the front center body case structure. A coupling shaft is mounted to the shaft and the geared architecture. The coupling shaft is at least partially supported by the first bearing.

In a further embodiment of the above, the shaft drives the fan through the geared architecture.

In a further embodiment of the above, the shaft is an inner shaft and comprises an outer shaft which at least partially surrounds the inner shaft. The outer shaft drives the high pressure compressor.

In a further embodiment of the above, the core housing includes a first inlet case portion that defines an inlet case flow path. A bearing support portion is removably secured to the inlet case portion. The second bearing is mounted to the bearing support portion.

In a further embodiment of the above, the core housing includes an intermediate case portion that defines an intermediate case flow path. A bearing support portion is removably secured to the intermediate case portion. The first bearing is mounted to the bearing support portion.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
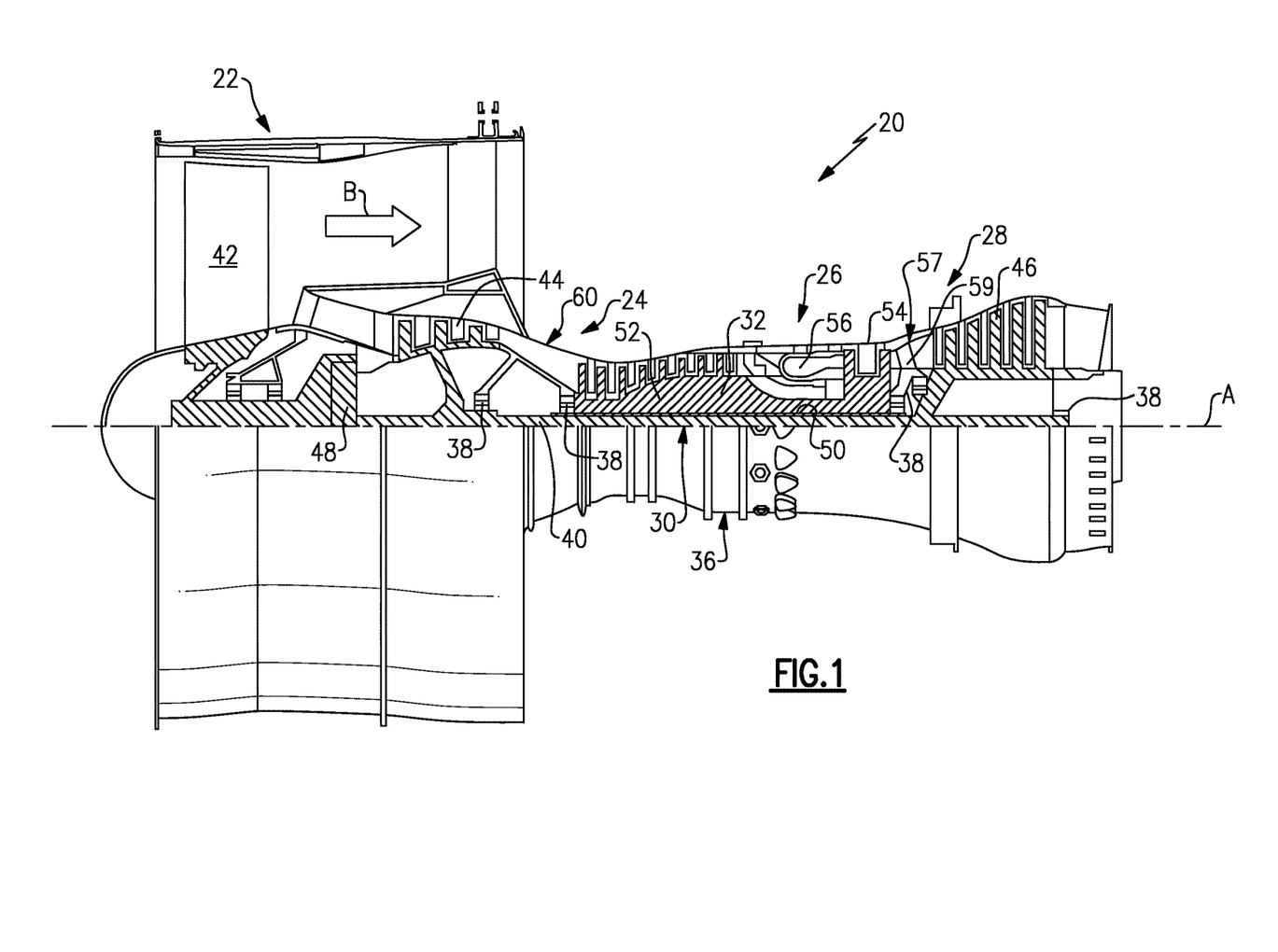
FIG. 1 schematically illustrates an embodiment of a gas turbine engine.
Figure 2:
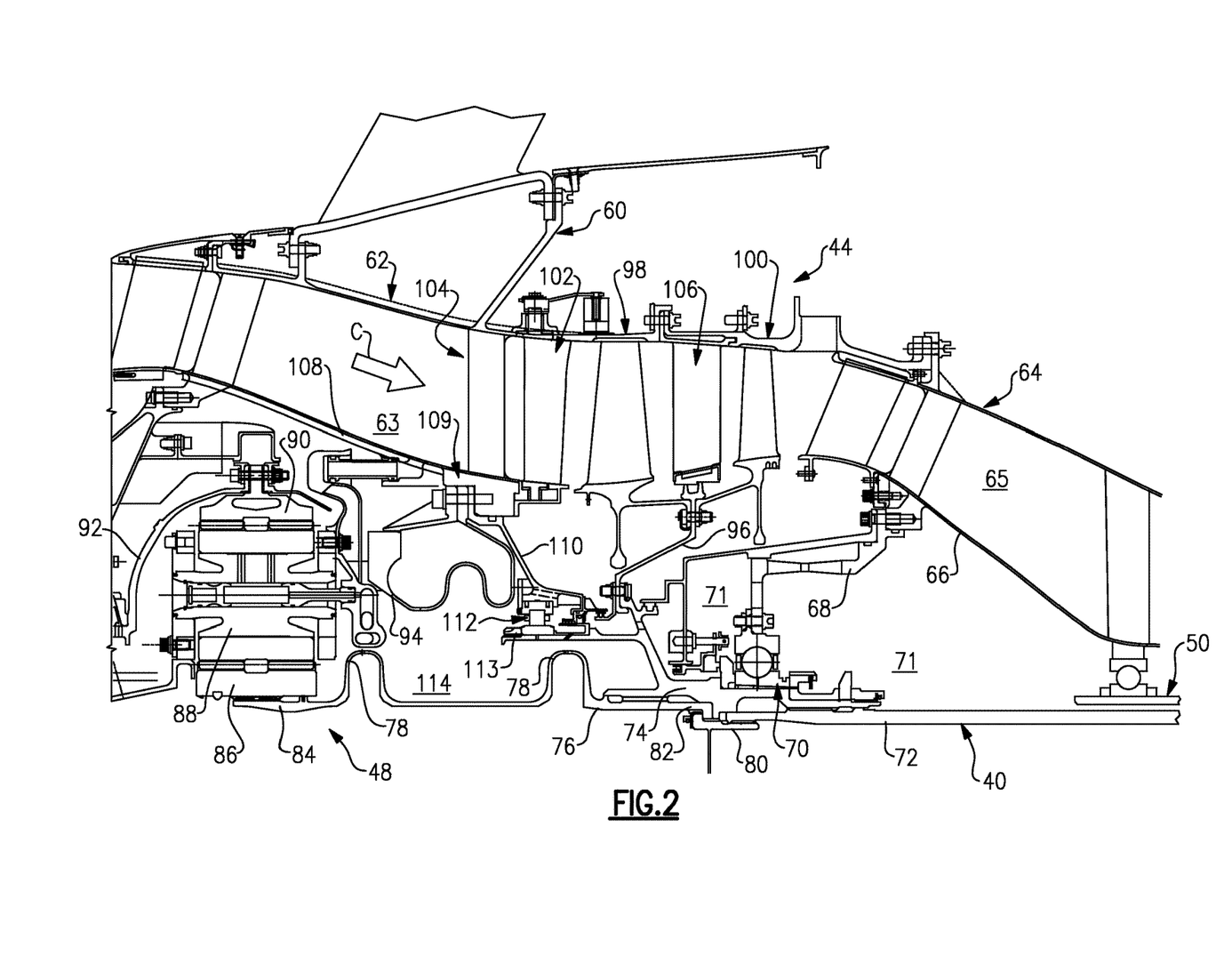
FIG. 2 is a cross-sectional view of a front architecture of the gas turbine engine embodiment shown in FIG. 1.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath B while the compressor section 24 drives air along a core flowpath C (as shown in FIG. 2) for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 supports one or more bearing systems 38 in the turbine section 28. The inner shaft 40 and the outer shaft 50 are concentric and rotate via bearing systems 38 about the engine central longitudinal axis A, which is collinear with their longitudinal axes.

The core airflow C is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example a high-bypass geared aircraft engine. In a further example, the engine 20 bypass ratio is greater than about six (6), with an example embodiment being greater than ten (10). The example speed reduction device is a geared architecture 48 however other speed reducing devices such as fluid or electromechanical devices are also within the contemplation of this disclosure. The example geared architecture 48 is an epicyclic gear train, such as a star gear system or other gear system, with a gear reduction ratio of greater than about 2.3, or more specifically, a ratio of from about 2.2 to about 4.0. In one disclosed embodiment, the engine 20 bypass ratio is greater than about ten (10:1), the fan diameter is significantly larger than that of the low pressure compressor 44, and the low pressure turbine 46 has a pressure ratio that is greater than about 5:1. Low pressure turbine 46 pressure ratio is pressure measured prior to inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as bucket cruise Thrust Specific Fuel Consumption ("TSFC"). TSFC is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(T_{ambient}° R)/518.7° R)^{0.5}]$. The "Low corrected fan tip speed" as disclosed herein according to one non-limiting embodiment is less than about 1150 ft/second.

Referring to FIG. 2, a core housing 60 includes an inlet case 62 and an intermediate case 64 that respectively provide an inlet case flowpath 63 and a compressor case flowpath 65. In other embodiments, the core housing may include additional cases. Similarly, the compressor section as a whole may include any number of cases. Together, the inlet and compressor case flowpaths 63, 65, in part, define a core flowpath through the engine 20, which directs a core flow C.

The intermediate case 64 includes multiple components, including the intermediate case portion 66, and the bearing support 68 in the example, which are removably secured to one another. The bearing support portion 68 has a first bearing 70 mounted thereto, which supports the inner shaft 40 for rotation relative to the intermediate case 64. In one example, the first bearing 70 is a ball bearing that constrains the inner shaft 40 against axial and radial movement at a forward portion of the inner shaft 40. The first bearing 70 is arranged within a bearing compartment 71.

In the example, the inner shaft 40 is constructed of multiple components that include, for example, a main shaft 72, a hub 74 and a flex shaft 76, which are clamped together by a nut 80 in the example. The first bearing 70 is mounted on the hub 74 (i.e., low pressure compressor hub). The flex shaft 76 includes first and second opposing ends 82, 84. The first end 82 is splined to the hub 74, and the second end 84 is splined to and supports a sun gear 86 of the geared architecture 48. Bellows 78 in the flex shaft 76 accommodate vibration in the geared architecture 48.

The geared architecture includes star gears 88 arranged circumferentially about and intermeshing with the sun gear 86. A ring gear 90 is arranged circumferentially about and intermeshes with the star gears 88. A fan shaft 92 is connected to the ring gear 90 and the fan 42 (FIG. 1). A torque frame 94 supports the star gears 88 and grounds the star gears 88 to the housing 60. In operation, the inner shaft 40 rotationally drives the fan shaft 92 with the rotating ring gear 90 through the grounded star gears 88.

The low pressure compressor 44 includes multiple compressor stages arranged between the inlet and intermediate case flowpaths 63, 65, for example, first and second compressor stages 98, 100, that are secured to the hub 74 by a rotor 96. The first bearing 70 is axially aligned with one of the first and second compressor stages 98, 100. In one example, a variable stator vane array 102 is arranged upstream from the first and second compressor stages 98, 100. Struts 104 are arranged upstream from the variable stator vane array 102. An array of fixed stator vanes 106 may be provided axially between the first and second compressor stages 98, 100. Although a particular configuration of low pressure compressor 44 is illustrated, it should be understood that other configurations may be used and still fall within the scope of this disclosure.

The inlet case 62 includes inlet case portions 108, and bearing support 110, which are removably secured to one another. The bearing support portion 110 and torque frame 94 are secured to the inlet case portion 108 at a joint 109. The bearing support portion 110 supports a second bearing 112, which is a rolling bearing in one example. The second bearing 112 is retained on the hub 74 by a nut 113, for example, and is arranged radially outward from the flex shaft 76 and radially between the torque frame 94 and flex shaft 76. In the example, the second bearing 112 is axially aligned with and radially inward of the variable stator vane array 102. The geared architecture 48 and the second bearing 112 are arranged in a lubrication compartment 114, which is separate from the bearing compartment 71 in the example.

Figure 3:
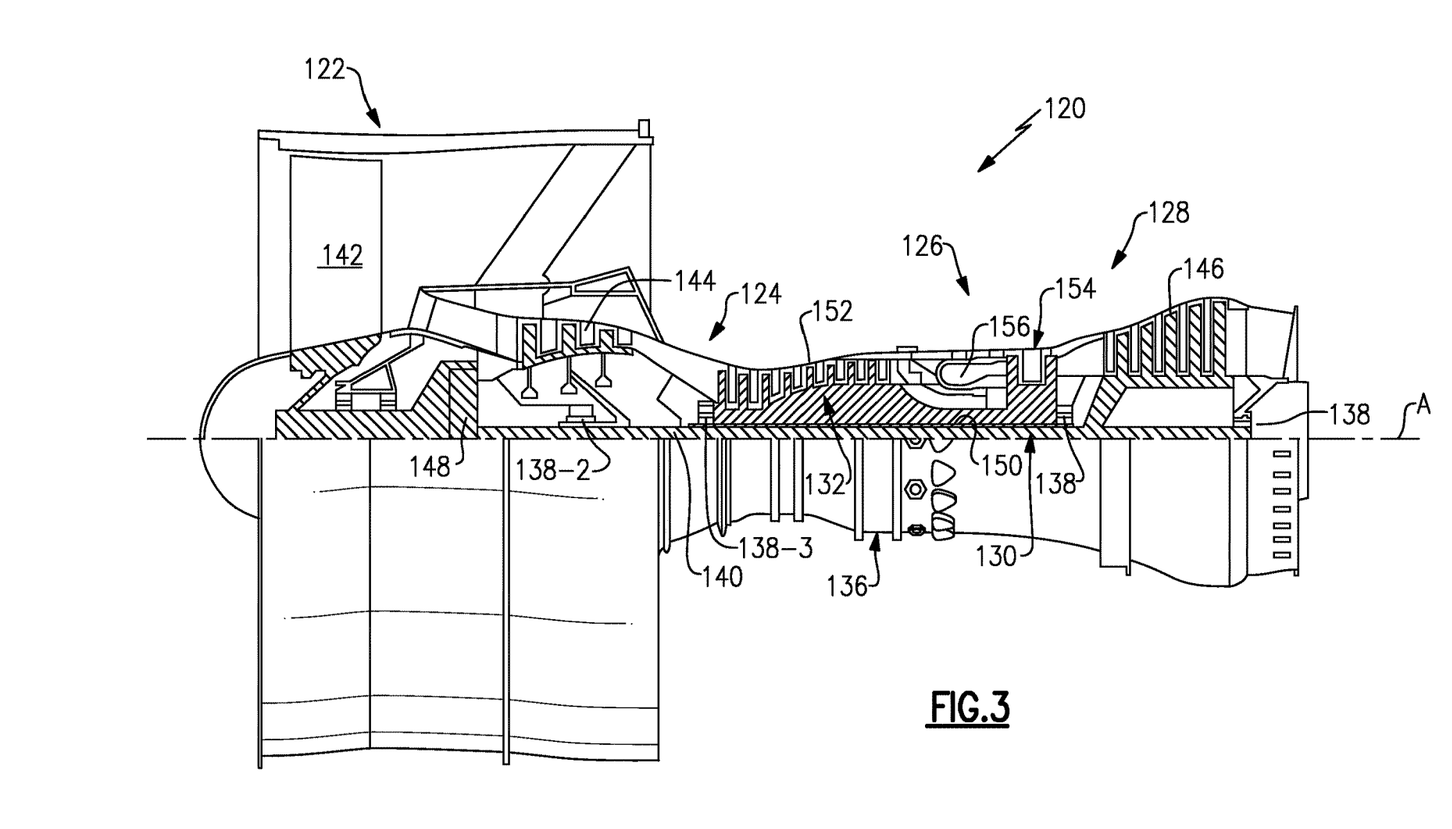
FIG. 3 is a schematic cross-section of a gas turbine engine embodiment.

FIG. 3 schematically illustrates another exemplary gas turbine engine 120. The gas turbine engine 120 is disclosed herein as a two-spool turbofan that generally incorporates a fan section 122, a compressor section 124, a combustor section 126 and a turbine section 128. Alternative engines might include an augmentor section (not shown) among other systems or features. The fan section 122 drives air along a bypass flowpath while the compressor section 124 drives air along a core flowpath for compression and communication into the combustor section 126 then expansion through the turbine section 128. Although depicted as a two-spool turbofan gas turbine engine in the disclosed non-limiting embodiment, it should be understood that the concepts described herein are not limited to use with turbofans as the teachings may be applied to other types of turbine engines such as a three-spool (plus fan) engine wherein an intermediate spool includes an intermediate pressure compressor (IPC) between the LPC and HPC and an intermediate pressure turbine (IPT) between the HPT and LPT.

The engine 120 generally includes a low spool 130 and a high spool 132 mounted for rotation about an engine central longitudinal axis A relative to an engine static structure 136 via several bearing supports 138. The low spool 130 generally includes an inner shaft 140 that interconnects a fan 142, a low pressure compressor 144 and a low pressure turbine 146. The inner shaft 140 drives the fan 142 through a speed change mechanism, which in exemplary gas turbine engine 20 is illustrated as a geared architecture 148 to drive the fan 142 at a lower speed than the low spool 130. An exemplary reduction transmission is an epicyclic transmission, namely a planetary or star gear system.

The high spool 132 includes an outer shaft 150 that interconnects a high pressure compressor 152 and high pressure turbine 154. A combustor 156 is arranged between the high pressure compressor 152 and the high pressure turbine 154. The inner shaft 140 and the outer shaft 150 are concentric and rotate about the engine central longitudinal axis A which is collinear with their longitudinal axes.

Core airflow is compressed by the low pressure compressor 144 then the high pressure compressor 152, mixed with the fuel and burned in the combustor 156, then expanded over the high pressure turbine 154 and low pressure turbine 146. The turbines 154, 146 rotationally drive the respective low spool 130 and high spool 132 in response to the expansion.

The main engine shafts 140, 150 are supported at a plurality of points by bearing supports 138 within the static structure 136. In one non-limiting embodiment, bearing supports 138 includes a #2 bearing system 138-2 located radially inboard of the compressor section 124.

Figure 4:
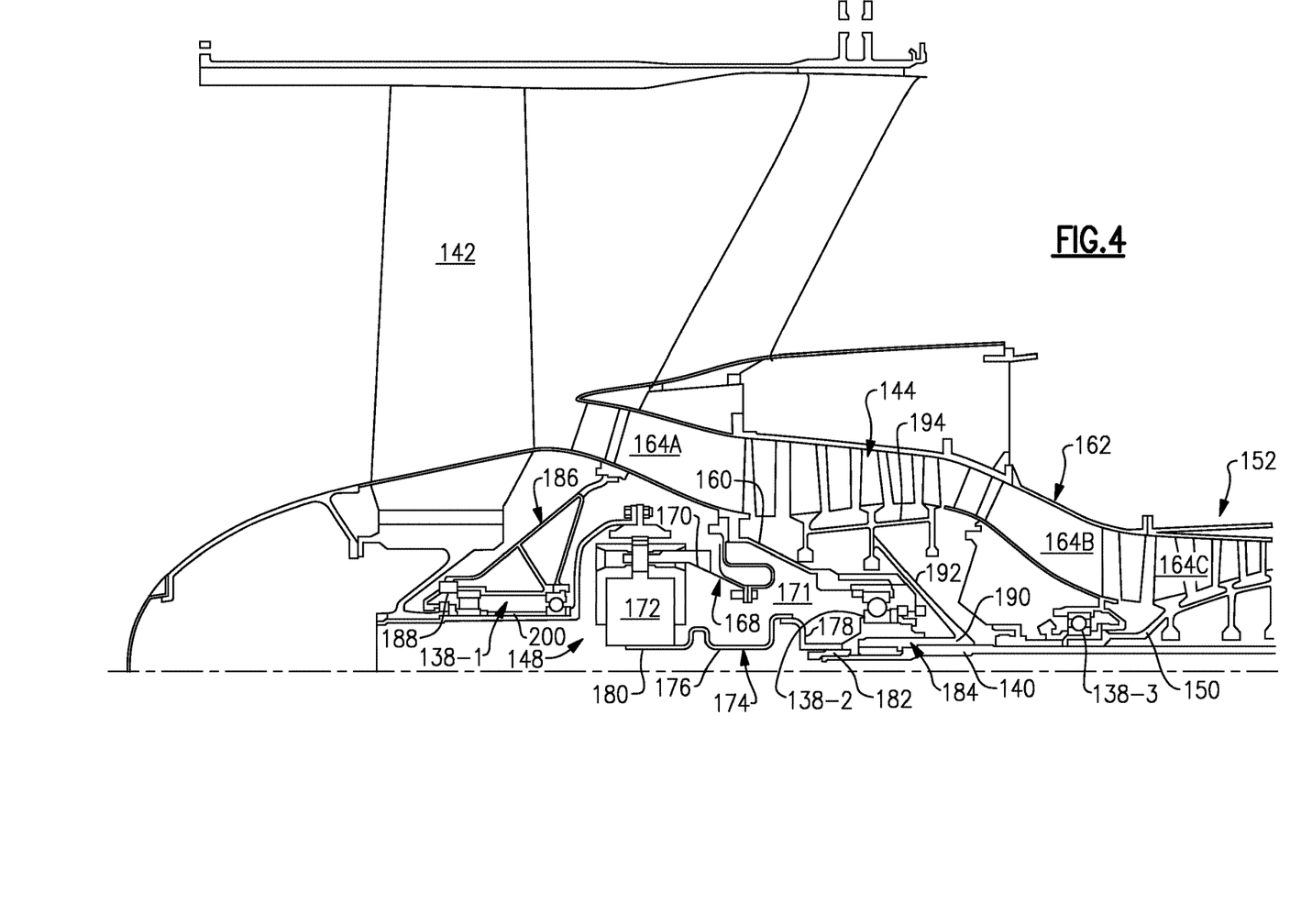
FIG. 4 is an enlarged schematic cross-section of a sectional of the gas turbine engine embodiment which illustrates a front center body case structure.

With reference to FIG. 4, the engine static structure 136 proximate the compressor section 124 generally includes a front center body case structure 160 and an intermediate case structure 162 which mounts aft of the front center body case structure 160. It should be appreciate that various case structures may alternatively or additionally be provided, yet benefit from the architecture described herein.

The front center body case structure 160 generally defines an annular core flow path 164A for the core airflow into the low pressure compressor 144. The intermediate case structure 162 defines a core flow path 164B which continues the core flow path 164A for the core airflow into the high pressure compressor 152 of core flow path 164C. The core flow path 164B is generally radially inward of the core flow path 164A to transition into the radially smaller diameter core flow path 164C. That is, the core flow path 164B defines a "wasp waist" gas turbine engine architecture.

A #2 bearing system 138-2 (i.e., second bearing) at least partially supports the inner shaft 140 relative to the front center body case structure 160. A #3 bearing system 138-3 (i.e., first bearing) generally supports the outer shaft 150 relative the intermediate case structure 162. That is, the #2 bearing system 138-2 at least partially supports the low spool 130 and the #3 bearing system 138-3 generally supports the high spool 132. It should be appreciated that various bearing systems such as thrust bearing structures and mount arrangements will benefit herefrom.

A flex support 168 provides a flexible attachment of the geared architecture 148 within the front center body case structure 160. The flex support 168 reacts the torsional loads from the geared architecture 148 and facilitates vibration absorption as well as other support functions. A centering spring 170, which is a generally cylindrical cage-like structural component with a multiple of beams that extend between flange end structures, resiliently positions the #2 bearing system 138-2 with respect to the low spool 130. In one embodiment, the beams are double-tapered beams arrayed circumferentially to control a radial spring rate that may be selected based on a plurality of considerations including, but not limited to, bearing loading, bearing life, rotor dynamics, and rotor deflection considerations.

The gearbox 172 of the geared architecture 148 is driven by the low spool 130 in the disclosed non-limiting embodiment through a coupling shaft 174. The coupling shaft 174 transfers torque to the gearbox 172. The #2 bearing system 138-2 facilitates the segregation of vibrations and other transients from the gearbox 172. The coupling shaft 174 in the disclosed non-limiting embodiment includes a forward coupling shaft section 176 and an aft coupling shaft section 178. The forward coupling shaft section 176 includes an interface spline 180 which mates with the gearbox 172. An interface spline 182 of the aft coupling shaft section 178 connects the coupling shaft 174 to the low spool 130 and, in this non limiting embodiment, to a low pressure compressor hub 184 of the low pressure compressor 144.

A fan rotor bearing system structure 186 aft of the fan 142 extends radially inward from the front center body case structure 160. The fan rotor bearing system structure 186 and the front center body case structure 160 define a bearing compartment 171. It should be appreciated that various bearing supports 138-1 and seals 188 (illustrated schematically and in FIG. 4) may be supported by the fan rotor bearing system structure 186 to contain oil and support rotation of an output shaft 200 which connects with the geared architecture 148 to drive the fan 142.

Figure 5:
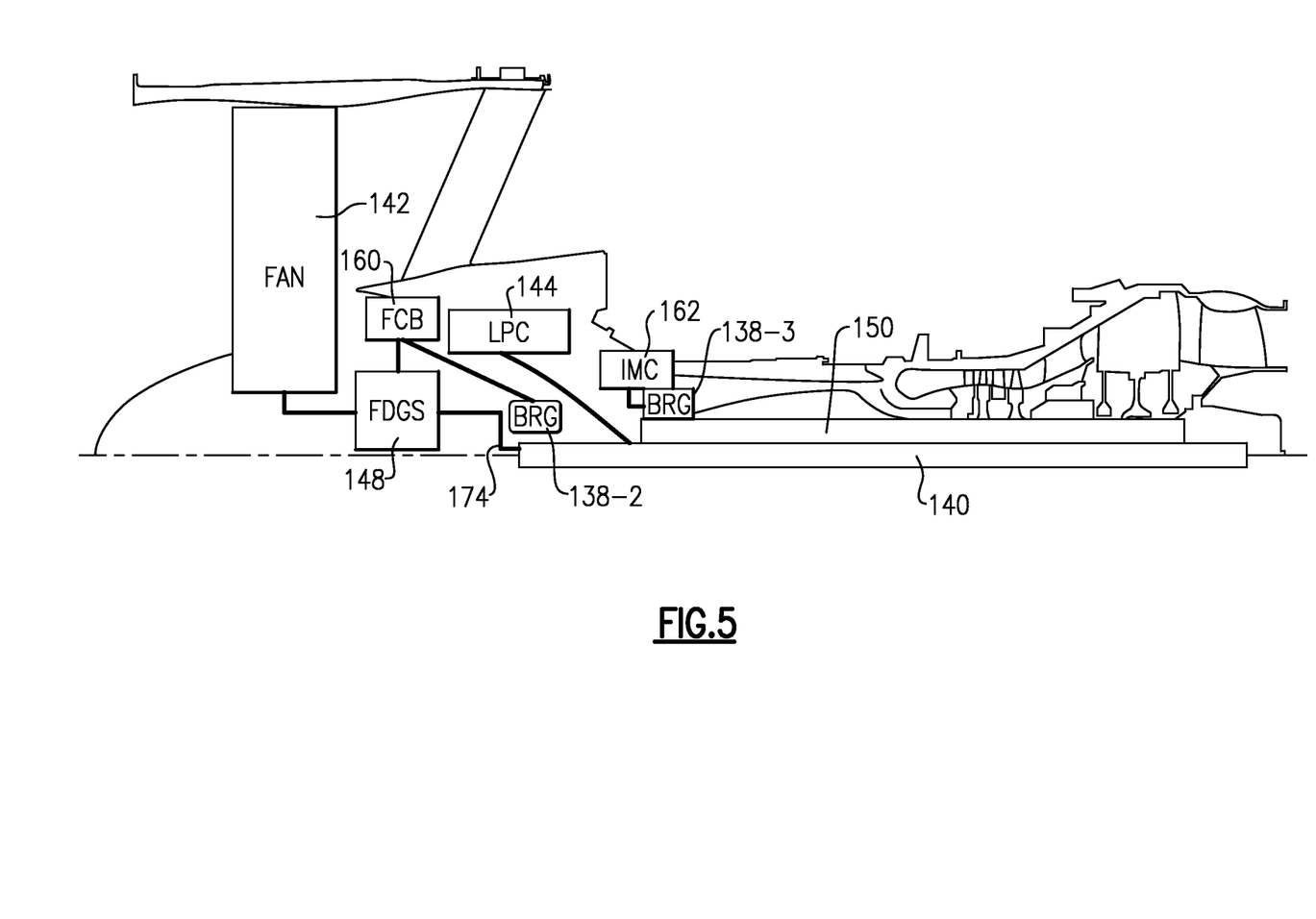
FIG. 5 is a schematic block diagram of a gas turbine engine embodiment with the disclosed architecture.

The low pressure compressor hub 184 of the low pressure compressor 144 includes a tubular hub 190 and a frustro-conical web 192. The tubular hub 190 mounts to the inner shaft 140 through, for example, a splined interface. The tubular hub 190 is adjacent to the #2 bearing system 138-2. The frustro-conical web 192 extends in a forwardly direction from the tubular hub 190 axially between the #2 bearing system 138-2 and the #3 bearing system 138-3 (also shown in FIG. 5). That is, the frustro-conical web 192 is axially located between the bearing supports 138-2, 138-3.

The frustro-conical web 192 mounts to a low pressure compressor rotor 194 of the low pressure compressor 144. In the disclosed non-limiting embodiment, the frustro-conical web 192 extends between the bearing systems 138-2, 138-3 and mounts to a second stage of a three stage low pressure compressor rotor 194. It should be appreciated that the frustro-conical web 192 may mount to other stages in other engine architectures and such architectures may include other numbers of stages.

Figure 6:
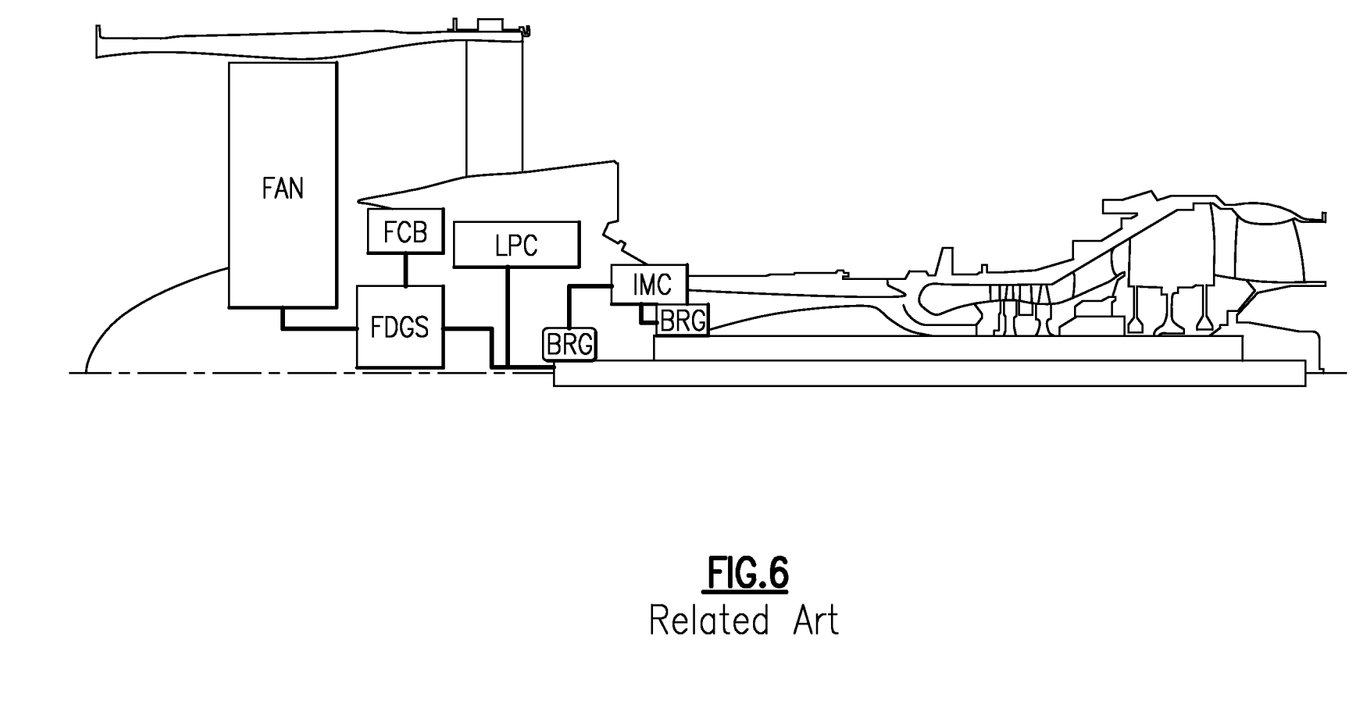
FIG. 6 is a schematic block diagram of a RELATED ART gas turbine engine with the disclosed architecture.

Locating the low pressure compressor hub 184 between the #2 bearing system 138-2 and the #3 bearing system 138-3 offers significant advantage to reduce deflection for the geared architecture 148 as compared to a related art architecture such as the example illustrated in FIG. 6; RELATED ART. That is, both end sections of the coupling shaft 174 are tied to the front center body case structure 160 such that relative deflections between the end sections thereof are greatly reduced. This facilitates a more efficient balance of baseline torque, FBO torques, maneuver deflections and the minimization of the overall loads that are translated into the geared architecture 148.

Moreover, a relatively less complicated bearing compartment 171 which facilitates increased manufacturing tolerances is defined to, for example, require fewer seals which minimizes potential oil leak sources and saves weight.

Figure 7:
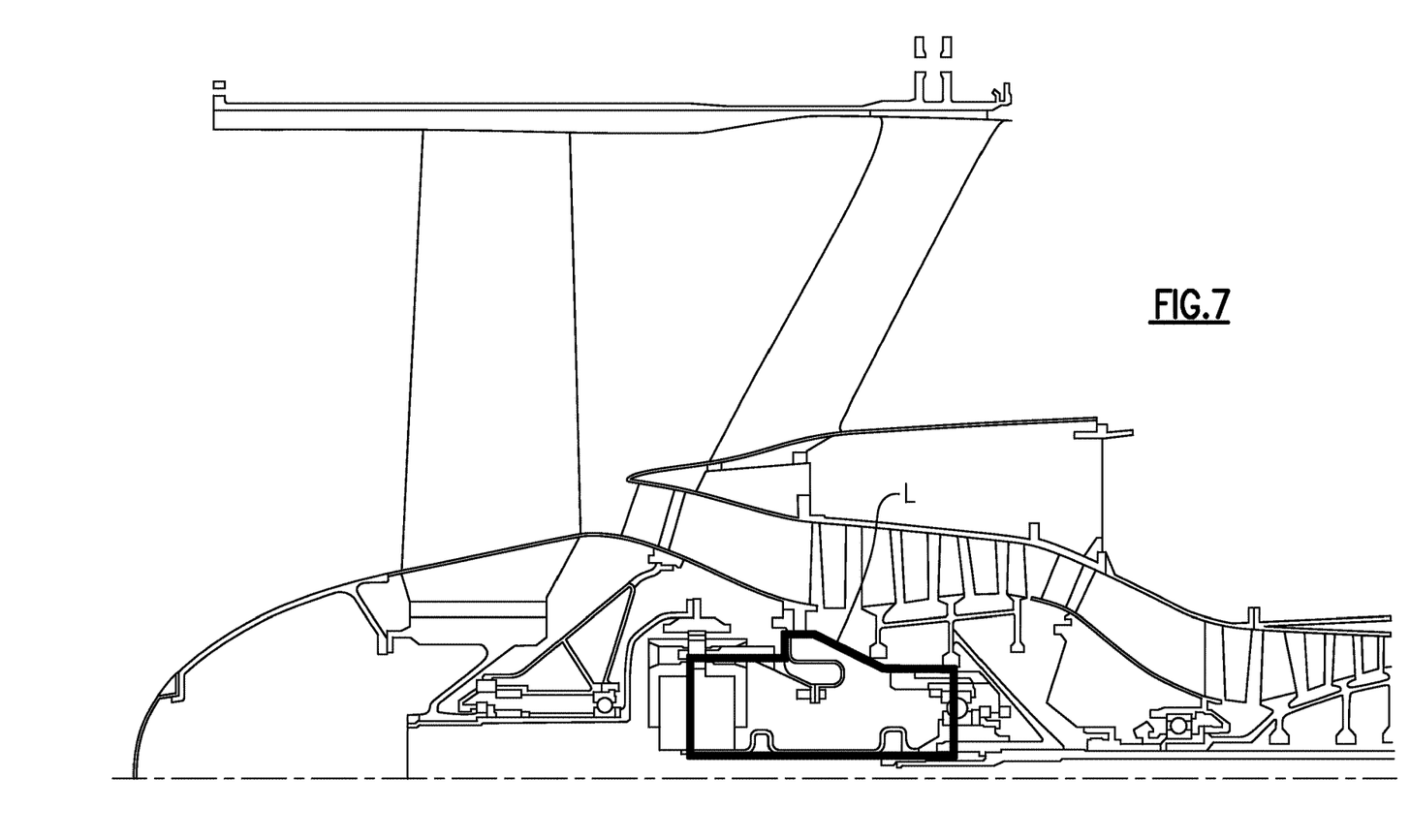
FIG. 7 is an enlarged schematic cross-section of the FIG. 5 sectional of the gas turbine engine embodiment which illustrates a load path within the front center body case structure.

The architecture further facilitates an efficient load path (L; FIG. 7) for the geared architecture and an overall lower overall heat generation and oil flow. That is, a more compact load path L is defined by the forward center body structure 160 alone in that the front center body structure 160 supports both the bearing system 138-2 and the geared architecture 148. Secondary benefits are reduced oil tank size, reduced cooler sizing and reduce oil quantity in the engine lubrication system.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A gas turbine engine comprising:
a core housing including static structure that provides an inlet case and an intermediate case that respectively provide an inlet case flow path and an intermediate case flow path of a core flow path;
a fan arranged fluidly upstream from the inlet case flow path;
a geared architecture;
a first shaft supporting a low pressure compressor section that is arranged axially between the inlet case flow path and the intermediate case flow path, wherein the first shaft is configured to drive the fan through the geared architecture, and wherein the fan is configured to drive air along the core flow path and into the low pressure compressor;
a first bearing supporting the first shaft relative to the intermediate case;
a second bearing supporting the first shaft relative to the inlet case;
a third bearing supporting a second shaft relative to the intermediate case; and
a low pressure compressor hub mounted to the first shaft, the low pressure compressor hub extends to and supports the low pressure compressor section between the first bearing and the second bearing, the low pressure compressor hub supporting the first bearing, the first and second bearings secured onto and engaging the low pressure compressor hub, and the low pressure compressor section includes multiple compressor stages having multiple disks, and the first bearing is axially aligned with one of the disks; wherein
the first shaft includes a main shaft and a gear input shaft, the gear input shaft secured to the main shaft at a first end and including a second end opposite the first end, wherein the geared architecture includes a sun gear supported on the second end, a portion of the low pressure compressor hub radially inboard of the second bearing is radially spaced from the gear input shaft, the low pressure compressor hub having a cantilevered portion that is unsupported at an inner diameter, the second bearing mounted on the cantilevered portion.

2. The gas turbine engine as recited in claim 1, wherein the low pressure compressor hub includes a frustro-conical web which extends between the first bearing and the second bearing.

3. The gas turbine engine as recited in claim 2, wherein the low pressure compressor is radially outboard of the first bearing.

4. The gas turbine engine as recited in claim 1, wherein the low pressure compressor hub is angled, relative to an engine axis, toward the low pressure compressor section.

5. The gas turbine engine as recited in claim 1, wherein low pressure compressor hub is mounted to a second stage disk of the low pressure compressor section.

6. The gas turbine engine according to claim 1, wherein the inlet case includes a first inlet case portion defining the inlet case flow path, and a bearing support portion removably secured to the inlet case portion, the second bearing mounted to the bearing support portion.

7. The gas turbine engine according to claim 1, wherein the intermediate case includes an intermediate case portion defining the intermediate case flow path, and a bearing support portion removably secured to the intermediate case portion, the first bearing mounted to the bearing support portion.

8. The gas turbine engine according to claim 1, wherein each of the first and third bearings is a ball bearing and the second bearing is a roller bearing.

9. The gas turbine engine according to claim 8, wherein the first and second bearings are arranged in separate sealed lubrication compartments.

10. The gas turbine engine according to claim wherein the low pressure compressor hub is secured to the main shaft.

11. The gas turbine engine according to claim 10, wherein the inlet case includes an inlet case portion defining the inlet case flow path, and a bearing support portion removably secured to the inlet case portion, the second bearing mounted to the bearing support portion.

12. The gas turbine engine according to claim 11, wherein the geared architecture includes a torque frame supporting multiple circumferentially arranged star gears intermeshing with the sun gear, the torque frame secured to the inlet case.

* * * * *

UNITED STATES PATENT AND TRADEMARK OFFICE
CERTIFICATE OF CORRECTION

PATENT NO. : 10,400,629 B2  Page 1 of 1
APPLICATION NO. : 14/012576
DATED : September 3, 2019
INVENTOR(S) : Brian D. Merry et al.

It is certified that error appears in the above-identified patent and that said Letters Patent is hereby corrected as shown below:

In the Claims

In Claim 10, Column 10, Line 35; replace "claim" with --claim 1--

Signed and Sealed this
Eighth Day of February, 2022

Drew Hirshfeld
*Performing the Functions and Duties of the*
*Under Secretary of Commerce for Intellectual Property and*
*Director of the United States Patent and Trademark Office*